Sept. 20, 1932.　　　　C. C. FULTON　　　　1,877,887
COMBINED TIRE AND LUGGAGE CARRIER FOR AUTOMOBILES
Filed Feb. 25, 1929　　2 Sheets-Sheet 1
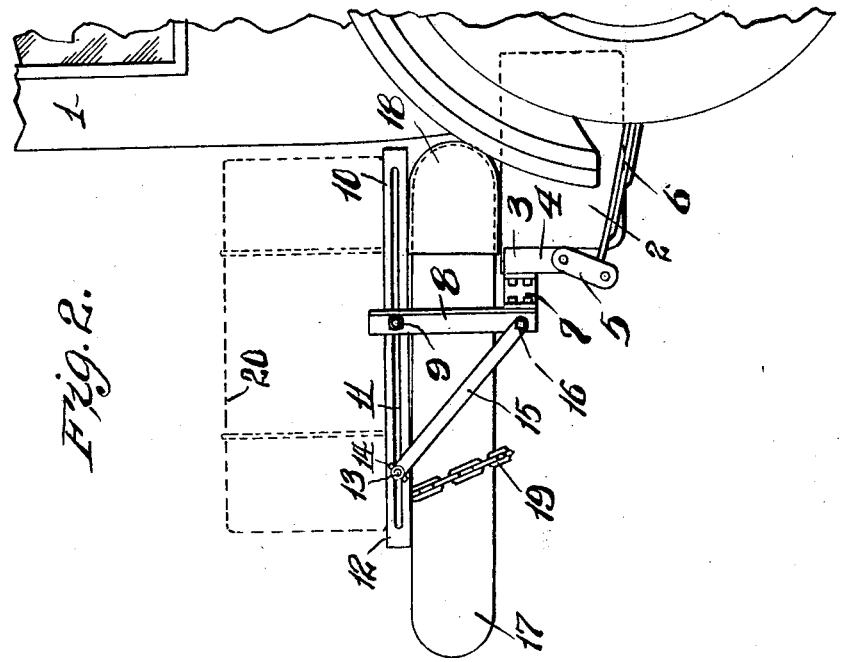
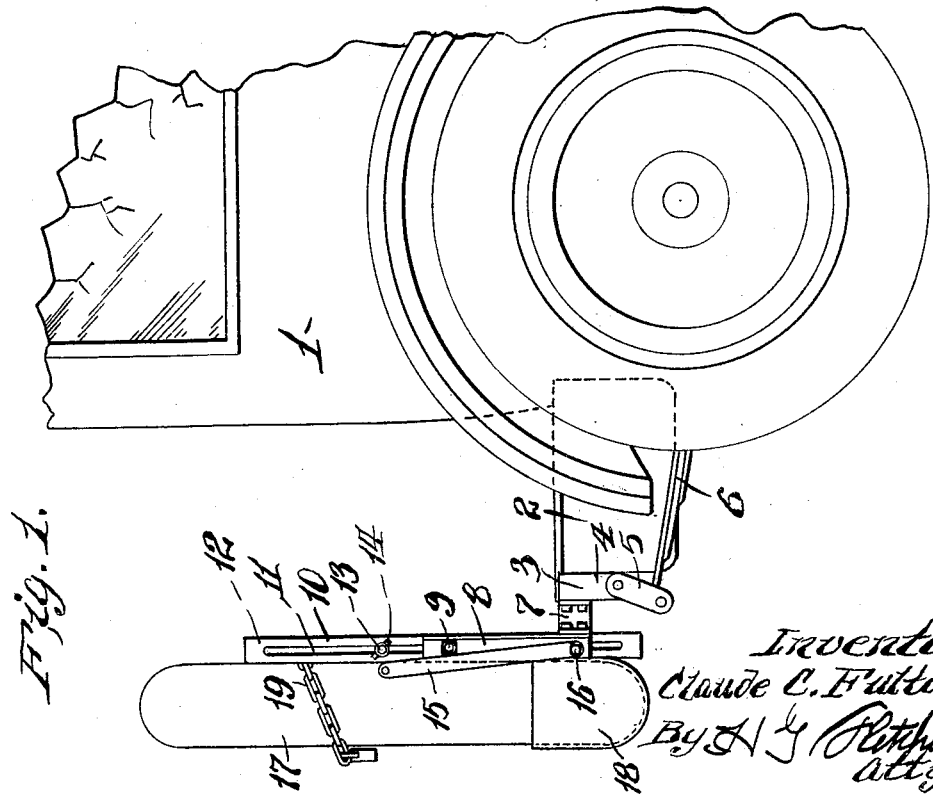

Sept. 20, 1932.   C. C. FULTON   1,877,887
COMBINED TIRE AND LUGGAGE CARRIER FOR AUTOMOBILES
Filed Feb. 26, 1929   2 Sheets-Sheet 2
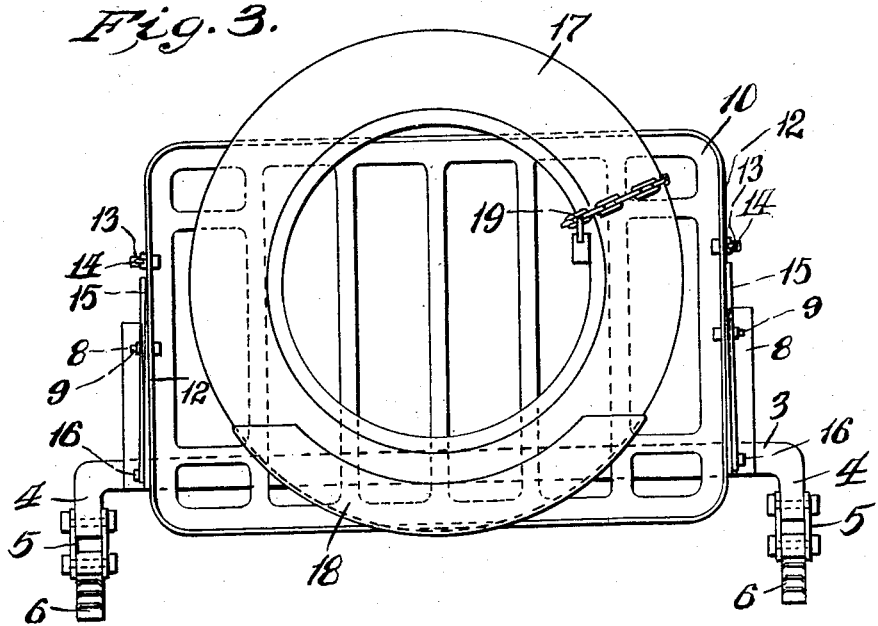
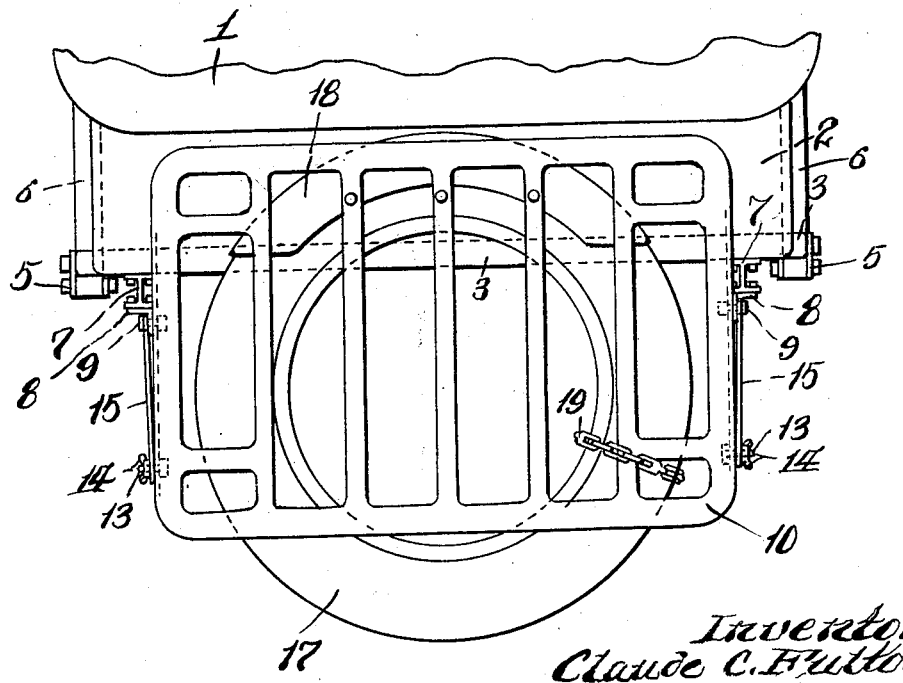
Inventor:
Claude C. Fulton.
By H G Fletcher
atty.

Patented Sept. 20, 1932

1,877,887

UNITED STATES PATENT OFFICE

CLAUDE C. FULTON, OF ST. LOUIS, MISSOURI

COMBINED TIRE AND LUGGAGE CARRIER FOR AUTOMOBILES

Application filed February 25, 1929. Serial No. 342,433.

This invention relates to certain new and useful improvements in a combined tire and luggage carrier for automobiles and has for its primary object the purpose of providing a tire carrier or rack which is adapted to be supported in either a vertical or horizontal position.

Another object of the invention is in providing a tire carrier of a construction so that it can be also used as a luggage carrier and when so used neither the spare tire nor the luggage when carried thereby will prevent access to each other.

A further object of the invention is in providing a combined tire and luggage carrier which is foldable.

Other and further objects will appear in the specification and be specifically pointed out in the appended claims, reference being had in the accompanying drawings, exemplifying the invention, and which:—

Figure 1 is a side elevation of this improved combined tire and luggage carrier showing it attached to an automobile and carried in a vertical position.

Figure 2 is a side elevation of the tire and luggage carrier disposed in a position for carrying luggage.

Figure 3 is a rear elevation of Fig. 1.

Figure 4 is a plan view of Fig. 2.

Referring by numerals to the accompanying drawings 1 designates the rear portion of an automobile body having a rearwardly disposed fuel tank 2 and rearwardly of said tank is a cross member 3 having depending end portions 4 which provide hangers for supporting the links 5 to which the rear ends of the body supporting leaf springs 6 are secured.

Extending outwardly from the cross members 3 are a pair of brackets 7, each of said brackets being for the support of a vertically extending leg 8 and disposed between said legs on clamping bolts 9 of which there are a pair, is a swingable tire supporting frame or rack 10. Each clamping bolt is borne by a respective leg 8.

The frame or rack 10 may be made of one piece or of a built up structure but in either event it is required that a longitudinally extending slot 11 be formed in each side member 12 of the rack and mounted in each slot 11 is a clamping bolt 13 having a wing nut 14. Each clamping bolt 13 is for cooperation with the upper end of a respective brace rod 15, each brace rod being swingingly secured at its lower end to a clamping bolt 16 which is borne by a respective leg 8.

When the frame or rack 10 is being used exclusively as a tire carrier, the rack is held in a vertical position between the legs 8 by the clamping screws 9, as shown in Fig. 1, the tire 17 having its lower disposed portion in a pocket 18 which is carried by the rack 10, the upper disposed portion of the tire being secured to the rack by a locking means such as the lock-chain 19. When it is desired to use the rack as a combined tire and luggage carrier, the clamping bolts 9 borne by respective legs 8 which are also mounted in respective slots 11 are loosened and the upper portion of the rack 10 bearing the tire 17 is swung downwardly and upon being swung downwardly is elevated so that the lower end of the rack will clear the protruding end of the cross member 3 and when the rack reaches an approximate horizontal position, said rack bearing the tire is pushed forwardly so that the rack and tire carried thereby will be disposed above the fuel tank 2 as shown in Fig. 2.

The clamping bolts 9 are then tightened and each of the brace rods 15 are swung upwardly on respective clamping bolts 16 and secured at their upper ends to respective clamping bolts 13 by the wing nuts 14, said brace rods when thus secured providing a reenforcement to the rack which is then disposed in the form of a platform.

After the rack 10 has been disposed in a horizontal position, the luggage designated as 20 in Fig. 2, is strapped to the rack by cordage and the like which may be passed over the luggage and secured to the cross bars which form part of the rack 10.

When the rack or frame 10 is being carried in a vertical position, the brace rods 15 are inclined vertically as shown in Fig. 1 and held in this position by the clamping bolts 16.

From the aforesaid description it is obvious that a simple, efficient and compact tire and luggage carrier is provided and in which minor changes may be made without departing from the spirit and intent of the invention.

What I claim is:—

1. A luggage carrier for an automobile comprising a supporting frame having a tire holding pocket, a pair of fixed vertically extending supporting legs between which said frame is slidably secured at the upper ends of said legs, and a brace extending from the lower end of each leg, each brace being slidably secured at its extending end to said frame.

2. In combination, an automobile having a rearwardly disposed fuel tank, a luggage frame, fixed vertically extending supports to the upper ends of which said frame is swingably and slidably secured to move to either vertical or horizontal positions, and tire securing means carried on one side of said frame adapted to be disposed over the fuel tank when said frame is moved to and secured in a horizontal position on said supports.

CLAUDE C. FULTON.